United States Patent
Catalano et al.

(10) Patent No.: US 10,152,842 B2
(45) Date of Patent: Dec. 11, 2018

(54) BEVERAGE VENDING MACHINE

(71) Applicant: A.A.T. AGROINDUSTRY ADVANCED TECHNOLOGIES S.P.A., Catania (IT)

(72) Inventors: Marcello Nunzio Catalano, Catania (IT); Salvatore Maria Vittorio Torrisi, Catania (IT); Antonio Giallanza, Capo d'orlando (IT)

(73) Assignee: A.A.T. AGROINDUSTRY ADVANCED TECHNOLOGIES S.P.A., Catania (IT)

( * ) Notice: Subject to any disclaimer, the term of this patent is extended or adjusted under 35 U.S.C. 154(b) by 0 days.

(21) Appl. No.: 15/538,901

(22) PCT Filed: Dec. 22, 2015

(86) PCT No.: PCT/IB2015/059870
§ 371 (c)(1),
(2) Date: Jun. 22, 2017

(87) PCT Pub. No.: WO2016/103172
PCT Pub. Date: Jun. 30, 2016

(65) Prior Publication Data
US 2017/0352224 A1    Dec. 7, 2017

(30) Foreign Application Priority Data

Dec. 22, 2014    (IT) .............................. BO2014A0714

(51) Int. Cl.
*G07F 13/06*        (2006.01)
*A23L 2/04*         (2006.01)
(Continued)

(52) U.S. Cl.
CPC .............. *G07F 13/065* (2013.01); *A23L 2/04* (2013.01); *A23N 1/02* (2013.01); *A47J 19/027* (2013.01)

(58) Field of Classification Search
CPC . A23N 1/00; A23N 1/02; G07F 13/065; A47J 19/02
(Continued)

(56) References Cited

U.S. PATENT DOCUMENTS 1,834,097 A    12/1931 Acosta
1,906,054 A *  4/1933 Freese ................... A47J 19/027
                                                            99/512

(Continued)

FOREIGN PATENT DOCUMENTS

FR    2498057 A1    7/1982
WO    2012007406 A1 1/2012

OTHER PUBLICATIONS

International Search Report dated Apr. 7, 2016 re: Application No. PCT/IB2015/059870; pp. 1-4; citing: WO 2012/007406 A2, U.S. Pat. No. 1,834,097 A, U.S. Pat. No. 4,924,770 A, U.S. Pat. No. 4,034,664 A, U.S. Pat. No. 2,369,406 A, FR 2 498 057 A1 and U.S. Pat. No. 6,202,547 B1.

(Continued)

*Primary Examiner* — Gene O Crawford
*Assistant Examiner* — Ayodeji T Ojofeitimi
(74) *Attorney, Agent, or Firm* — Cantor Colburn LLP (57) ABSTRACT

A beverage vending machine includes at least one outer casing with at least one magazine for accommodating agricultural products of fruit and vegetables. The machine is functionally associated with at least one device for centrifugal juicing of the agricultural products to obtain a centrifugally juiced fraction that can be utilized outside the casing. The centrifugal juicing device includes at least one element (Continued)

for the automatic pressing of at least one agricultural product to be subjected to centrifugal juicing against a rotating reference surface, affected by a component for automatically shredding the agricultural product supplied by the magazine for its optimum centrifugal juicing.

6 Claims, 7 Drawing Sheets

(51) Int. Cl.
*A47J 19/02* (2006.01)
*A23N 1/02* (2006.01)

(58) Field of Classification Search
USPC ............... 100/130–131; 99/495, 501, 502
See application file for complete search history.

(56) References Cited

U.S. PATENT DOCUMENTS

| | | | |
|---|---|---|---|
| 2,109,048 A * | 2/1938 | Lorenzen | A47J 19/027 241/152.1 |
| 2,325,779 A * | 8/1943 | Kraber | A23N 1/00 99/512 |
| 2,369,406 A | 2/1945 | Reynolds | |
| 4,034,664 A | 7/1977 | Hassell | |
| 4,924,770 A | 5/1990 | Raub | |
| 5,170,699 A * | 12/1992 | Senalada | A23N 1/003 99/504 |
| 5,339,729 A * | 8/1994 | Anderson | A23N 1/00 100/213 |
| 5,355,784 A * | 10/1994 | Franklin | A47J 19/027 241/199.12 |
| 5,479,851 A * | 1/1996 | McClean | A47J 19/027 210/360.1 |
| 5,628,247 A * | 5/1997 | Palumbo | A23N 1/003 100/121 |
| 6,202,547 B1 | 3/2001 | Tseng | |
| 7,000,534 B1 * | 2/2006 | Mendes | A23N 1/003 100/108 |
| 8,146,490 B2 * | 4/2012 | Obersteiner | A47J 19/027 241/273.2 |
| 9,795,240 B2 * | 10/2017 | Desjardin | A47J 19/02 |
| 2005/0095470 A1 * | 5/2005 | Harding | H01M 8/04201 429/413 |
| 2007/0056450 A1 * | 3/2007 | Hensel | A47J 19/02 99/495 |
| 2010/0058941 A1 * | 3/2010 | Rivera | A47J 19/02 99/513 |
| 2014/0001011 A1 * | 1/2014 | Pourshakour | A23L 2/02 198/550.5 |
| 2015/0342245 A1 * | 12/2015 | Hensel | A47J 19/027 99/509 |
| 2016/0095461 A1 * | 4/2016 | Desjardin | A47J 19/02 99/513 |
| 2016/0183708 A1 * | 6/2016 | Catalano | A47J 19/02 99/510 |
| 2016/0213052 A1 * | 7/2016 | Ali | H05B 6/80 |
| 2016/0219923 A1 * | 8/2016 | Hensel | A23N 1/02 |

OTHER PUBLICATIONS

Written Opinion dated Apr. 7, 2016 re: Application No. PCT/IB2015/059870; pp. 1-5; citing: WO 2012/007406 A2, U.S. Pat. No. 1,834,097 A, U.S. Pat. No. 4,924,770 A, U.S. Pat. No. 4,034,664 A, U.S. Pat. No. 2,369,406 A, FR 2 498 057 A1 and U.S. Pat. No. 6,202,547 B1.

* cited by examiner

BEVERAGE VENDING MACHINE

TECHNICAL FIELD

The present disclosure relates to a beverage vending machine.

BACKGROUND

Vending machines capable of providing beverages and foods of various types, typically following the payment of a preset amount, which is managed by means of an adapted interface, are ever more extensively widespread.

Vending machines of the type described above are in fact installed for example in public spaces such as for example shopping malls, train stations or subway stations, gymnasiums, swimming pools, parking lots or, more simply, along streets or at the edges of city squares.

Moreover, similar devices are increasingly often made available to employees of companies, and therefore within offices, factory buildings, workshops or other workplaces.

In all the contexts described above, vending machines have a common structure, which, as is known, provides for an outer casing, which is usually boxlike and encloses internally the foodstuffs that can be dispensed, as well as the automation systems required to perform the dispensing.

On the front wall of the casing, in addition to a window from which it is possible to withdraw the requested product, there is the interface, which allows the user to interact with the vending machine in order to send the request for the specific goods of interest and make the corresponding payment, as mentioned earlier.

Although vending machines intended for dispensing snacks, sweets, complete hot meals are not absent from the market, a large portion of the market is occupied by vending machines for beverages of various kinds.

In this case also, it is straightforward to note that the offer is highly varied; by means of the vending machine it is in fact possible to purchase and consume one or more beverages among mineral water, coffee, tea, milk, hot chocolates, soft drinks, energy drinks, freshly squeezed fruit juices, etc.

Moreover, it should be noted that recently, alongside the demand for freshly squeezed fruit juices, the market is developing a growing interest in extracts of fruit (or also of other agricultural products), which often offer interesting advantages with respect to freshly squeezed fruit juices.

In fact, although both freshly squeezed juices and extracted juices ensure the possibility to quench one's thirst more healthily than soft drinks and the like, and allow parents to circumvent the natural aversion of their children to consuming fruit and vegetables, extracts (due to the specific manner in which they are obtained) often have a more balanced nutritional content than freshly squeezed fruit juices.

Moreover, more simply, the centrifugal juicing process can constitute a valid alternative where, due to the specific type of fruit (for example an apple), squeezing does not allow to obtain quality juice in a practical manner.

Indeed for the reasons described above, recently some manufacturers have put on the market vending machines which, following a specific request of the consumer, are capable of subjecting to centrifugal juicing a fruit accommodated in an internal magazine and to provide externally the juice thus obtained.

However, these constructive solutions are not devoid of drawbacks.

First of all, it should be noted that the centrifugal juicing process provides for the coordinated execution of different activities (cutting, shredding, and pressing, in addition of course to the step of actual centrifugal juicing of the materials progressively obtained), which usually require a manual contribution of the user. Therefore, it is immediately evident that it is very difficult to be able to obtain quality extract by means of the vending machine, indeed due to the difficulty in automating steps and processes that are usually entrusted at least partially to a human being. The difficulty described above in fact leads manufacturers to renounce some steps, with evident negative consequences on the quality of the extract.

Moreover, in order to be able to obtain effective centrifugal juicing, it is necessary to ensure precise and correct feeding of said juice extractor, and the magazines and any transfer mechanisms used in commercially available vending machines are often found to be inadequate for this delicate task.

Moreover, the requirements described above, which as mentioned are met only partly by known vending machines, must clash with the need, which is obviously equally important, to keep the overall cost of the apparatus within low values, in order to avoid making the installation of the vending machine uneconomical (or having to impose an excessively high purchase price of the extracts).

SUMMARY

The aim of the present disclosure is to solve the problems described above, by providing a vending machine that allows to dispense extracts of good quality.

Within this aim, the disclosure provides a vending machine that allows to store in an optimum manner the agricultural products to be subjected to centrifugal juicing.

The disclosure also provides a vending machine that allows to transfer precisely and at the same time simply the agricultural products to be subjected to centrifugal juicing to the device intended for this purpose.

The disclosure further provides a vending machine that has low costs and ensures high reliability in operation.

The disclosure also provides a vending machine that is safe in application.

The disclosure further provides a vending machine that can be obtained easily starting from commonly commercially available elements and materials.

These advantages as well as others that will become better apparent hereinafter, are achieved by providing a beverage vending machine, comprising at least one outer casing, provided with at least one magazine for accommodating agricultural products of the type of fruit and vegetables, functionally associated with at least one device for centrifugal juicing of the agricultural products, in order to obtain an extract that can be utilized outside said casing, characterized in that said at least one centrifugal juicing device comprises at least one element for the automatic pressing of at least one agricultural product to be subjected to centrifugal juicing against a rotating reference surface, affected by means for the automatic shredding of the at least one agricultural product, supplied by said magazine, for its optimum centrifugal juicing.

BRIEF DESCRIPTION OF THE DRAWINGS

Further characteristics and advantages of the disclosure will become better apparent from the description of a preferred but not exclusive embodiment of the vending machine according to the disclosure, illustrated by way of non-limiting example in the accompanying drawings, wherein.

DETAILED DESCRIPTION OF THE DRAWINGS

With reference to FIGS. 1-7, the reference numeral 1 generally designates a beverage vending machine, which comprises at least one outer casing 2, which typically but not exclusively is shaped like a parallelepiped.

The casing 2 has at least one magazine 3 for accommodating agricultural products A, of the type of fruit and vegetables, which can be accessed for example by means of a front door 4 of the casing 2, which is intended to support the user interface (optionally of a traditional type), by means of which the user can control the dispensing of the desired goods, and the corresponding payment.

The magazine 3 is functionally associated with at least one device 5 for centrifugal juicing of the agricultural products A, in order to obtain an extract that can be used outside the casing 2 (indeed following an appropriate request formulated by a user by means of the interface).

It is useful to specify that the term "extract" is understood to reference a juice (of fruit or vegetables) obtained indeed by centrifugal juicing; in this context, the vending machine 1 according to the disclosure can be used to obtain an extract from any type of fruit or vegetable (or agricultural product A in general) one wishes, and optionally the final beverage can also be composed of juices extracted from two or more different agricultural products A (for example by supplying simultaneously the magazine 3 with two or more types of fruit or vegetable).

For example, in the magazine 3 (through the door 4) it is possible to accommodate apples, pears or other fruits, chosen for example among those scarcely suitable for squeezing (although the provision of extracts of oranges or other citrus fruits is not excluded). Moreover, the device 5 can be used effectively for the centrifugal juicing of carrots, fennels, celeries, tomatoes and other orchard vegetables and/or other vegetables.

According to the disclosure, the centrifugal juicing device 5 comprises at least one automatic pressing element 6 for at least one agricultural product A to be subjected to centrifugal juicing, against a rotating reference surface 7.

Moreover, the reference surface 7 is affected by means for the automatic shredding of the agricultural product A, provided by the magazine 3, in order to thus obtain its optimum centrifugal juicing.

In particular, in the embodiment proposed in the accompanying figures by way of nonlimiting example of the application of the disclosure, the automatic pressing element 6 comprises a linear actuator 8 (preferably but not exclusively of the telescopic type), which can be actuated automatically by a respective control and management unit (for example when the latter receives the request to dispense an extract from the user) during the rotation of the reference surface 7.

Figure 1:
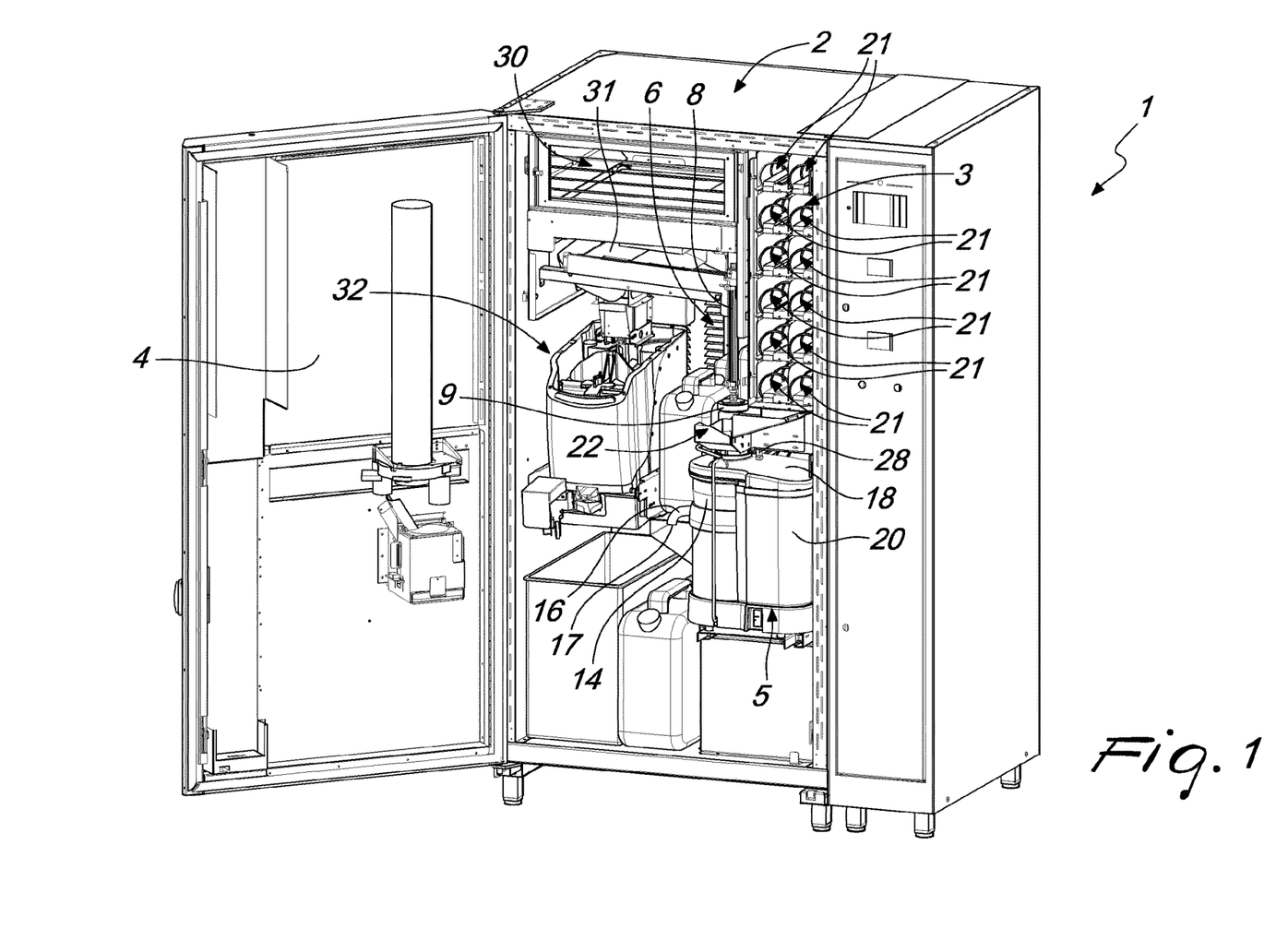
FIG. 1 is a schematic right front perspective view of the vending machine according to the disclosure.
Figure 2:
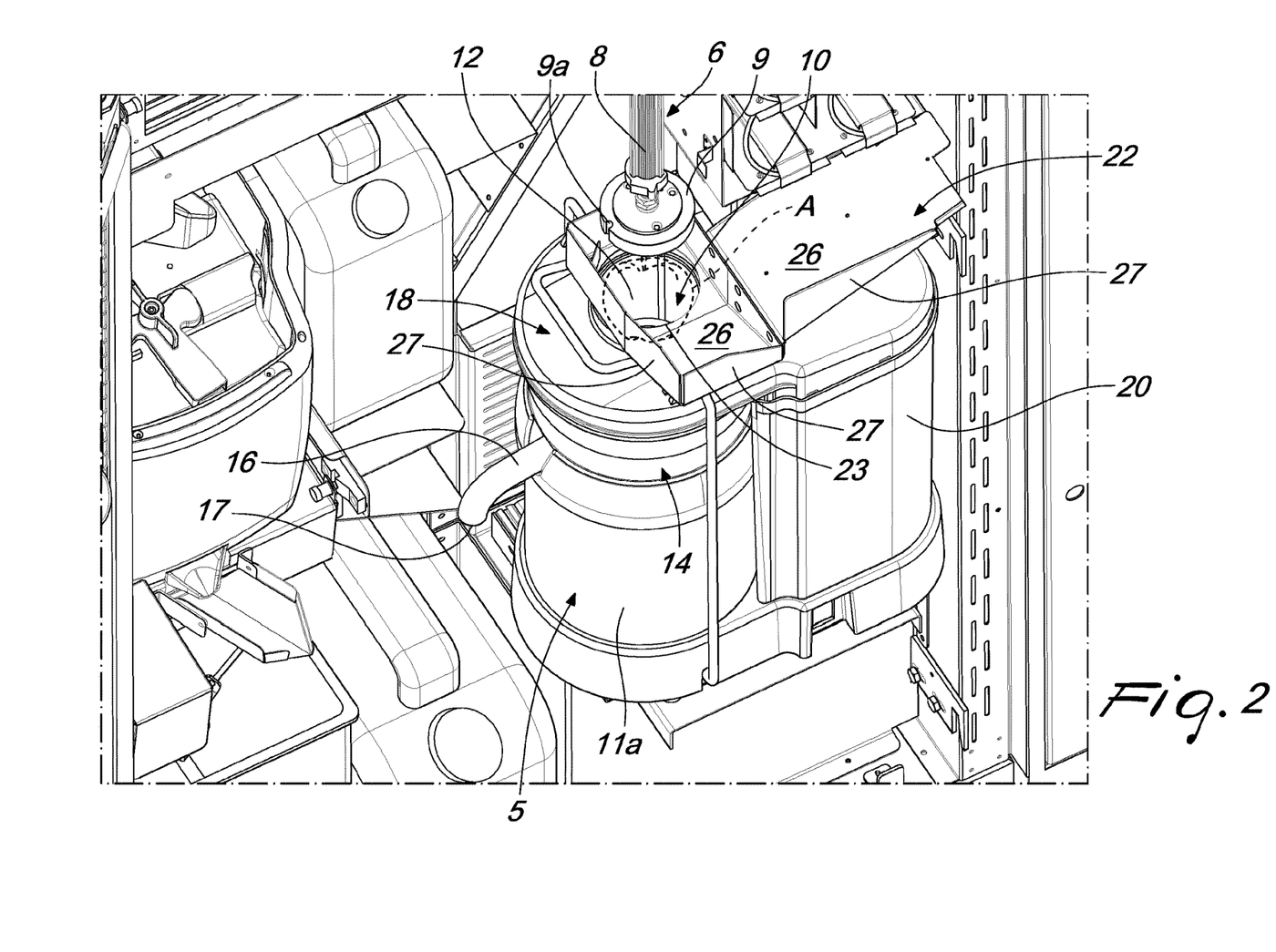
FIG. 2 is a right front perspective view of a first highly enlarged detail of the vending machine of FIG. 1.
Figure 3:
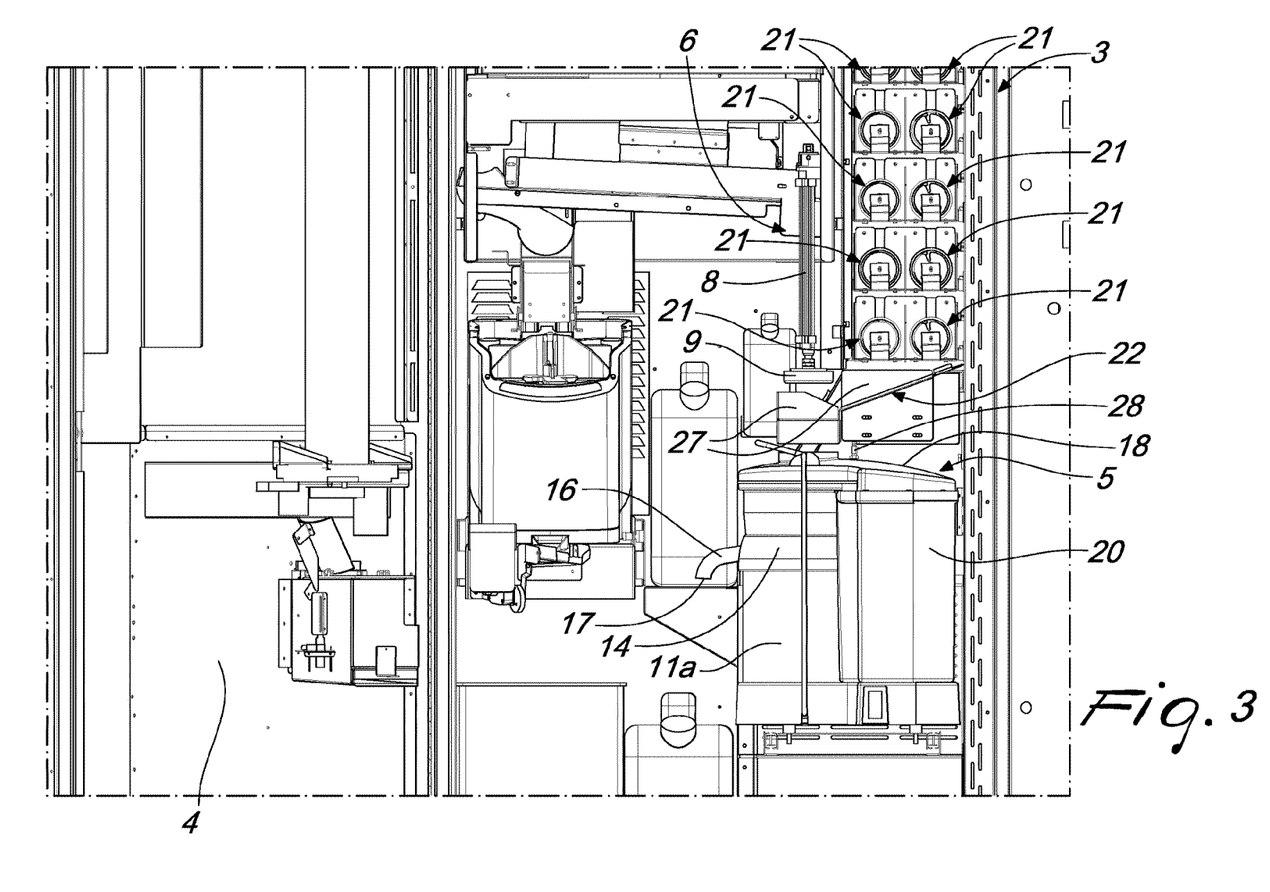
FIG. 3 is a front view of a second highly enlarged detail of the vending machine of FIG. 1.
Figure 4:
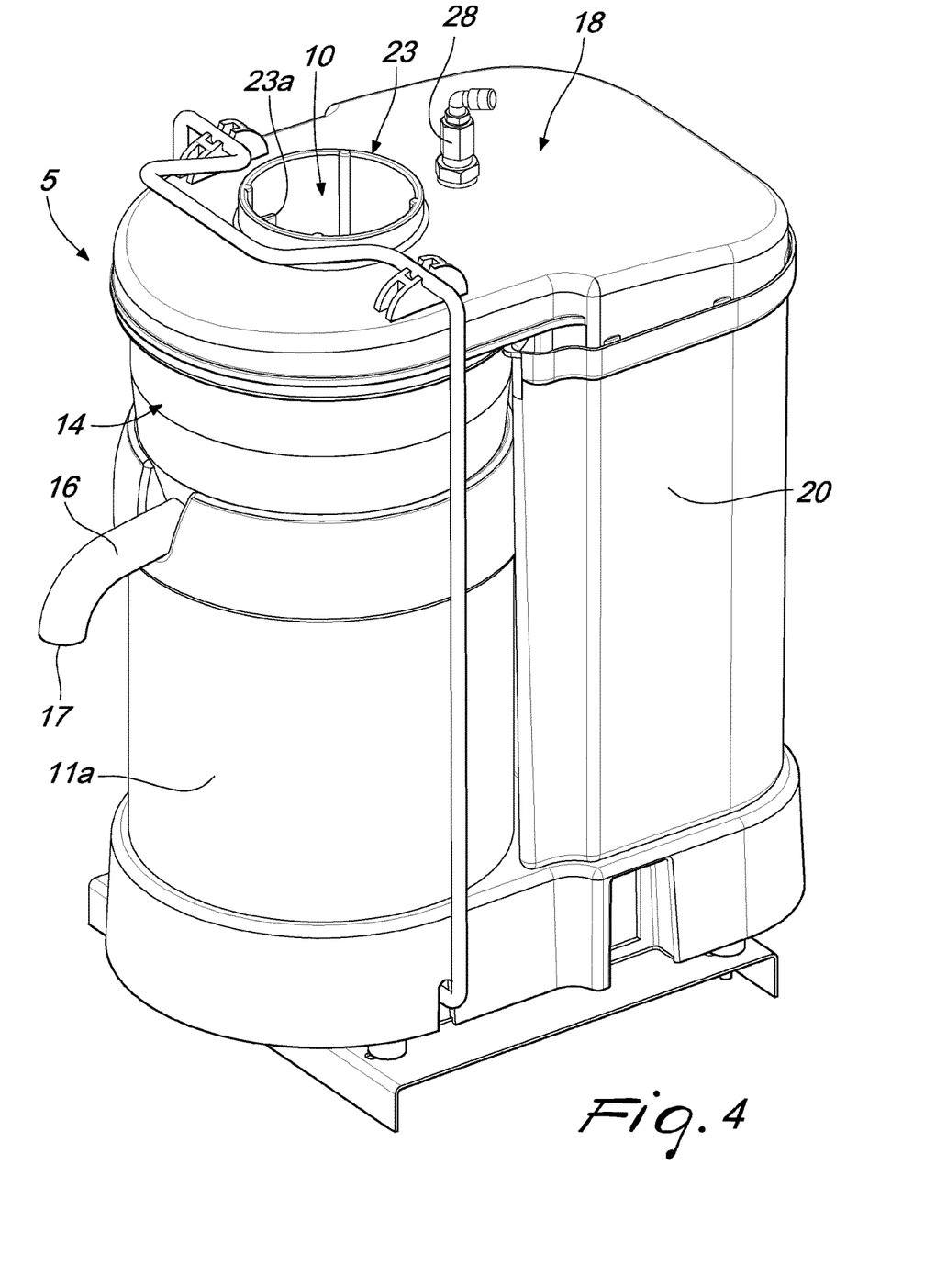
FIG. 4 is a right front perspective view of the centrifugal juicing device.

The actuation by the control and management unit thus allows to move the actuator 8 to pass from a first inactive extreme position, in which it is spaced from the reference surface 7 and in which the actuator 8 is shown in FIGS. 1, 2 and 3, to a second active extreme position, and vice versa.

Figure 6:
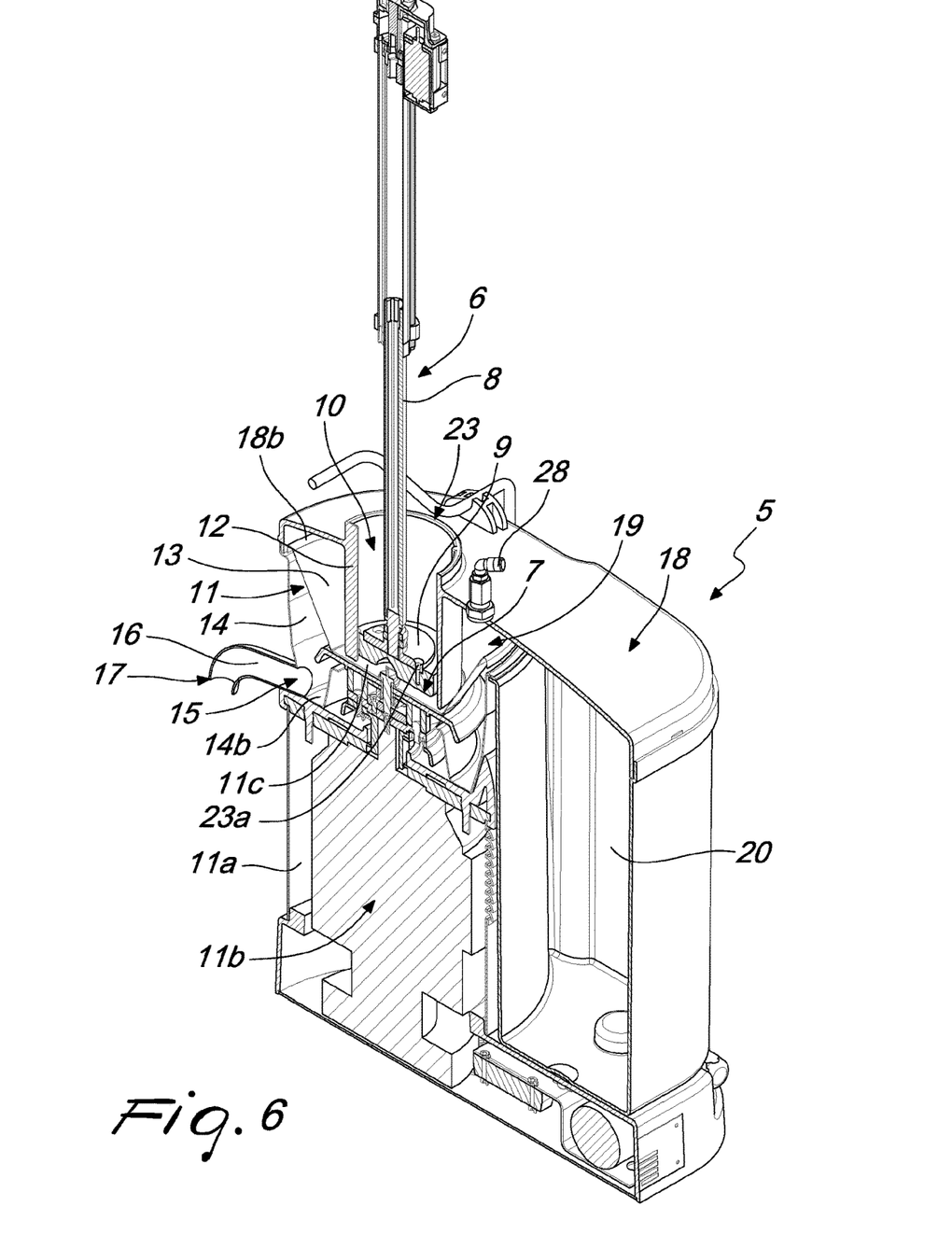
FIG. 6 is a partially sectional perspective view of a detail of the centrifugal juicing device of FIG. 4 in a possible condition of operation.
Figure 7:
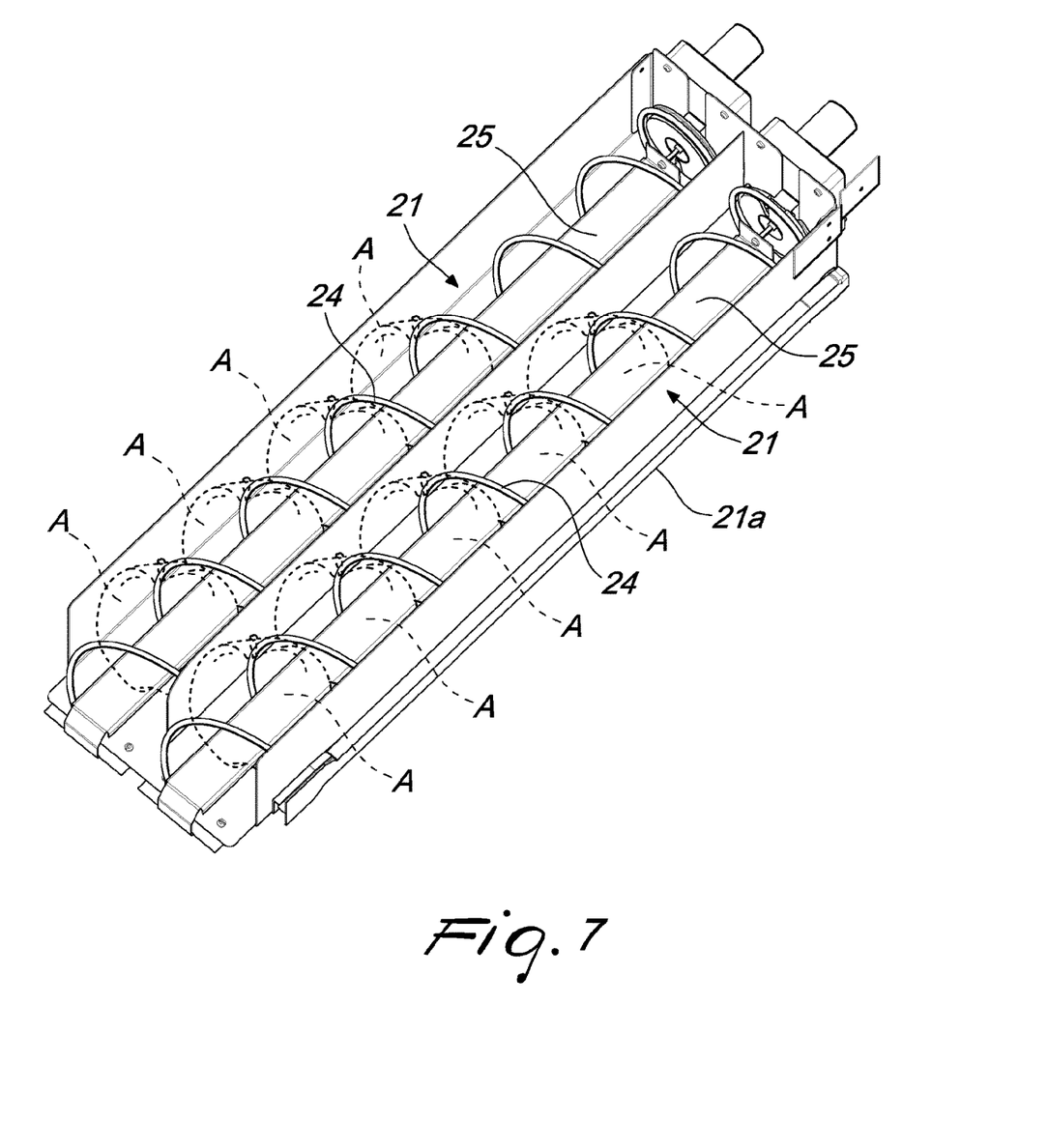
FIG. 7 is a right front perspective view of a component of the magazine.

In this second extreme position, a pestle 9 supported by one end of the actuator 8 faces and is proximate to the reference surface 7 and is accommodated at least partially in a chamber 10 for the containment of the agricultural product A, for example therefore in the arrangement proposed in FIG. 6.

During the transition of the actuator 8 from the first extreme position to the second extreme position, therefore, the agricultural product A introduced beforehand in the chamber 10 is pressed by the pestle 9 against the respective reference surface 7.

Even more particularly, the already cited shredding means comprise a plurality of at least partially pointed teeth, which protrude from the reference surface 7 and are directed toward the pestle 9.

The teeth (not shown for the sake of simplicity in the accompanying figures) might be micro-protrusions distributed along the reference surface 7 or may be larger, but in any case said surface, with said teeth, behaves like a sort of grater, capable of shredding effectively (and automatically) the agricultural product A introduced within the chamber 10 and pressed by the pestle 9.

In a preferred embodiment, which however does not limit the application of the disclosure, the centrifugal juicing device 5 comprises a substantially frustum-shaped rotating tank 11 (it should be noted, for example in FIG. 6, that gears 11b actuated by the control and management unit might be accommodated in an underlying compartment 11a in order to ensure rotation).

Figure 5:
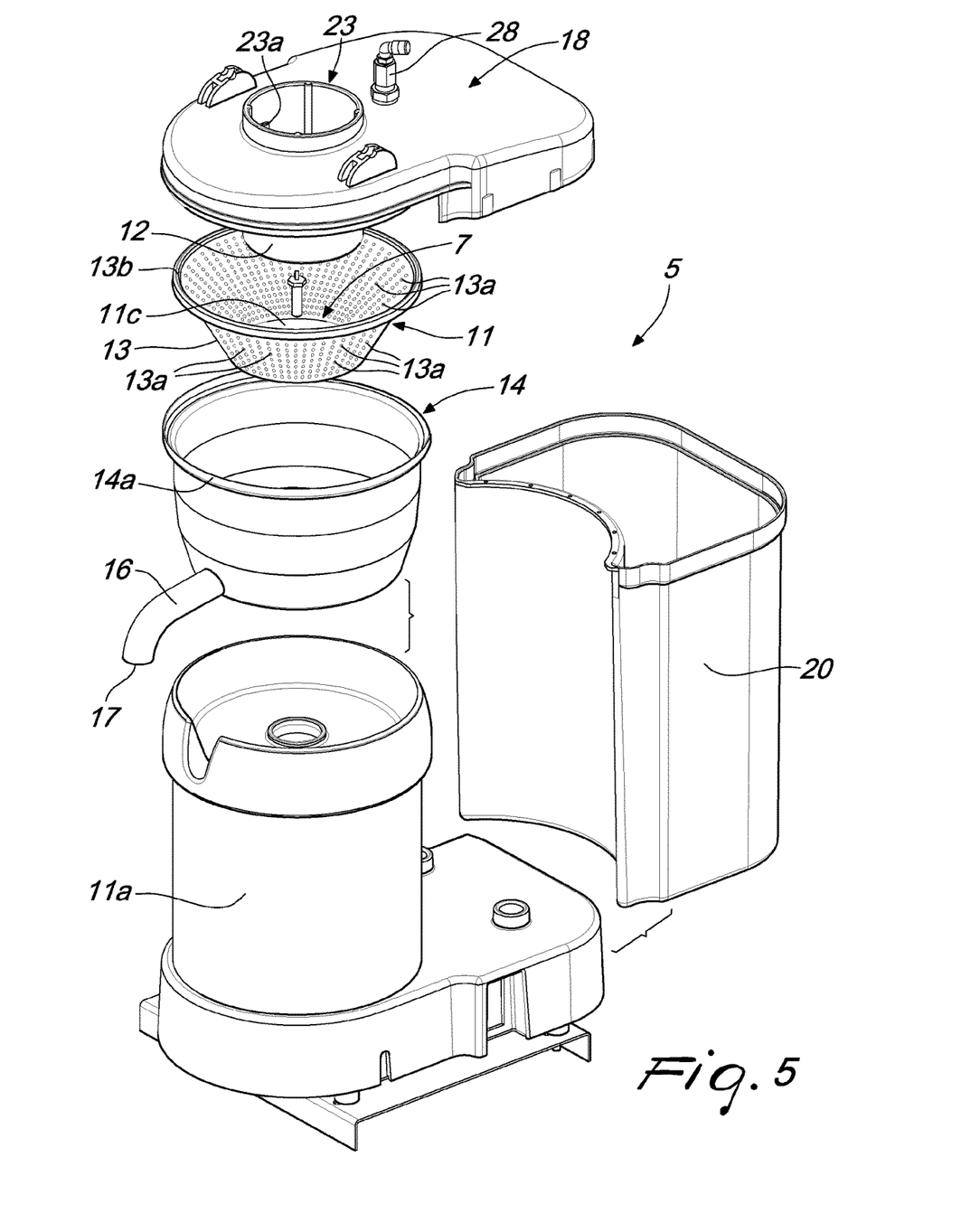
FIG. 5 is an exploded perspective view of the centrifugal juicing device of FIG. 4.

As can be seen clearly for example from FIG. 5, the tank 11 is open upward, at its larger end face, and is closed in a downward region, at its smaller end face, by a floor 11c, which indeed constitutes (in this preferred embodiment) the reference surface 7.

The pestle 9, therefore, can move along a direction that coincides with the axis of the tank 11 (therefore at right angles to the floor 11c) and is accommodated coaxially, in the second extreme position, in a guiding sleeve 12 which defines, together with the reference surface 7, the containment chamber 10.

Conveniently, the lateral surface of the frustum-shaped tank 11 is constituted by a metal sheet 13, which has a plurality of holes 13a that are chosen appropriately so as to filter the substances obtained during the rotation of the floor 11c as a consequence of the pressing and shredding actions.

By choosing appropriately the size and shape of the holes 13a it is in fact possible to prevent the passage through the metal sheet 13 of the particles that are larger than the extension of the holes 13a: this substantially allows to separate the liquid part, which constitutes the extract (and which is indeed capable of flowing through the holes 13a) from the pulp and from the peel, which form the centrifugal juicing waste (and which, due to their larger dimensions, are unable to pass through the holes 13a of the metal sheet 13).

More particularly, and as shown clearly for example by FIG. 6, in the preferred but not exclusive embodiment, the substantially frustum-shaped tank 11 is accommodated coaxially in an external pot 14.

Furthermore, a folded lip 13b of the metal sheet 13, provided at the larger end face of the tank 11 (of which the sheet 13 constitutes, as mentioned, the lateral surface), is rested so that it can rotate on the open upper rim 14a of the pot 14.

Such pot 14 in turn has, on its bottom 14b, a manifold 15 that is associated with a channel 16 affected by a first pump, preferably (but not exclusively) of the type of peristaltic pumps.

Through the manifold 15, the extract progressively obtained by filtration is thus conveyed automatically into the channel 16 and, after passing through the metal sheet 13, falls by gravity onto the bottom 14b of the pot 14.

In this regard, it is specified that the bottom 14b can be substantially flat and arranged horizontally or preferably inclined toward the manifold 15, so as to facilitate the forced conveyance of the extract toward the channel 16.

The channel 16 then leads to a nozzle 17 for dispensing the extract, which is obtained by filtration through the metal sheet 13 and therefore can be made available to the user directly or, preferably, after it has been collected beforehand into a container (for example a cup), which in turn can be taken from the outside through a slot provided in the door 4.

Advantageously, the tank 11 and the pot 14 are partially closed by an upper lid 18: while part of the lip 13b is arranged in direct contact with the lid 18, between a portion of the lip 13b and the lid 18 there is an interspace 19 (see in this regard FIG. 6) that faces a vessel 20 for collecting the centrifugal juicing waste. It should be noted that during the rotation of the tank 11 this waste, as well as the juice propelled by the centrifugal force toward the lateral surface of said tank, but prevented from passing through the holes 13a, rise automatically and progressively along the metal sheet 13 up to the lip 13b and from there can thus fall by gravity, again automatically, into the vessel 20 (which can optionally be periodically removed temporarily in order to empty it of the waste accumulated therein over time).

Usefully, the magazine 3 comprises at least one drawer 21 which faces a chute 22 that is inclined toward an opening 23 provided in the lid 18 and such as to define an inlet for the sleeve 12.

The drawer 21 is provided with an automatic movement assembly, which is controlled by the control and management unit and is capable of transferring one by one the agricultural products A toward the inclined chute 22 (onto which they can therefore fall by gravity) and then toward the centrifugal juicing device 5.

In particular, the magazine 3 is constituted substantially by a plurality of mutually facing boxlike drawers 21 distributed on a plurality of respective planes: for example, in the embodiment proposed by way of example in the accompanying figures, the magazine 3 is composed of twelve drawers 21 that are distributed vertically on six planes (each of which is provided with two mutually facing drawers 21).

Moreover, it should be noted that each drawer 21 is arranged on guides 21a that allow its easy extraction (for example to replenish the reserves of agricultural products A in the magazine 3).

More particularly, each drawer 21 faces the chute 22 and is provided with a respective assembly, constituted substantially by a wire 24 that is wound helically around a track 25 for the agricultural products A, which is accommodated in the respective drawer 21.

Each wire 24, propelled by a drive unit (controlled indeed by the control and management unit), can rotate about the corresponding track 25 in order to move at least one agricultural product A arranged along the track 25, between two consecutive turns of such wire 24, which is wound helically.

Each wire 24 is therefore automatically capable of pushing each agricultural product A toward the edge of the respective drawer 21 to make it then fall toward the chute 22.

In order to be able to receive by gravity the agricultural products A from each drawer 21, the chute 22 is arranged at a lower vertical level than the lowest plane of the magazine 3 and is constituted by one or more inclined ramps 26 (for example two, arranged substantially at right angles, as in the accompanying figures), the last of which faces the opening 23.

It should be noted that the chute 22 can also have lateral partitions 27, which rise from one or both of the sides of each ramp 26, in order to avoid the danger that the agricultural products A, along the path toward the opening 23, might accidentally fall laterally without reaching the centrifugal juicing device 5.

For the same reason, it is possible to arrange a housing, also capable of facilitating the correct path of the agricultural products A, preventing them from falling beyond the chute 22, in front of the drawers 21 (and appropriately spaced from them).

With reference to the opening 23 introduced earlier, it should also be noted that at least one protrusion 23a (FIGS. 4 and 5) can conveniently protrude from said opening inward and, by engaging a respective axial groove 9a provided along the side wall of the pestle 9, during the stroke of the latter toward the second extreme position facilitates the correct centering of said pestle 9 upon insertion in the guiding sleeve 12.

Advantageously, the vending machine 1 according to the disclosure comprises an apparatus for washing the centrifugal juicing device 5. Such apparatus comprises at least one second pump, preferably (but not exclusively) of the type of gear pumps, which is associated with a duct for the delivery of a pressurized washing fluid. Merely by way of example, it is specified that said washing fluid might simply be water, drawn from the mains and/or accumulated in an adapted reservoir located within the casing 2, or the fluid can be compressed air.

The duct (not shown for the sake of simplicity in the accompanying figures) leads to at least one nozzle 28, which preferably but not exclusively is arranged on the lid 18 and is directed toward the metal sheet 13 of the tank 11: the nozzle 28 thus allows to spray the lateral surface of the tank 11 (the metal sheet 13) with a substantially "fan-shaped" spray. This allows to remove any deposits constituted by residues of peel and pulp that adhere to the metal sheet 13 and are potentially capable of blocking the holes 13a and therefore of compromising the efficiency of the filtration process.

It should be noted in any case that the nozzle 28 might be arranged in another point of the vending machine 1 according to the disclosure or the latter might be provided with two or more nozzles 28 (located or not on the lid 18).

It is important to note that in a first version, the vending machine 1 according to the disclosure can be intended exclusively for the dispensing of extracts, in the manners described so far and thus having a casing 2 that accommodates the components that have already been introduced and optionally the additional ones, even of a known type, that are useful to complete its operation.

In a different version, which moreover corresponds to the solution proposed in the accompanying figures, in addition to the above cited elements the vending machine 1 according to the disclosure is also provided with the components capable of squeezing fruit (of the type of citrus fruits, but not only) or other agricultural products A, and thus offer the consumer the possibility to choose between an extract and a freshly squeezed juice.

For this purpose, therefore, the vending machine 1 can also have an additional storage compartment 30 (for fruit or vegetables to be squeezed), which is connected, by means of an inclined plate 31, to a squeezing unit 32, which is therefore capable of providing a consumer with juice that has indeed been obtained by squeezing an orange or other agricultural products A.

In the embodiment introduced in the last few paragraphs, when requested by the consumer the vending machine 1 can thus dispense both an extract (of one or more agricultural products A) and a freshly squeezed juice, as well as a beverage obtained by mixing them, and therefore a juice obtained by centrifugal juicing (by means of the centrifugal juicing device 5) mixed with a juice obtained by squeezing (by way of the squeezing unit 32), thereby proposing a choice that is highly varied and interesting for consumers.

Operation of the vending machine according to the disclosure is as follows.

As mentioned, the vending machine 1 offers the user the possibility to consume a beverage, of the type of an extract of fruit or vegetables, thus being able to rely on the known properties of juices obtained according to this method, and thus being able to enjoy a tasty and nutritious beverage, certainly obtaining the favor of consumers, who are increasingly careful regarding the nutritional aspects of foods and beverages as well as their taste.

In greater detail, by means of an adapted interface (through which it is optionally possible to also manage the demand for freshly squeezed juices, as shown), the user can send the request to dispense the extract to the control and management unit, which thus actuates automatically all the components involved.

First of all, in fact, the control and management unit causes the rotation of the wire 24 of one of the drawers 21, pushing beyond the rim a respective agricultural product A until it falls onto the chute 22, which conveys it to the opening 23, through which the agricultural product A falls into the containment chamber 10.

It should be noted that in order to cause the fall of an agricultural product A the control and management unit (an electronic controller or the like) can impose a 360° rotation to the wire 24, so as to cause the advancement of each agricultural product A by the equivalent of the pitch of the helically wound wire 24 proper.

For subsequent requests, the control and management unit can actuate the same wire 24, so long as there are agricultural products A (accommodated as mentioned, between corresponding consecutive turns), in the respective drawer 21, to then move on to another drawer 21, and so forth.

In any case, when the agricultural product A is introduced in the containment chamber 10, as already mentioned it is first of all subjected to the combined action of the pestle 9 (which is made to advance appropriately by the control and management unit from the first extreme position toward the second extreme position). The pestle 9 presses the agricultural product A against the floor 11c that constitutes the reference surface 7 and the shredding means (the teeth of such floor 11c) also operate at the same time.

Indeed this combined action, performed while the entire tank 11 is rotating (preferably at high speed) about its own axis, ensures an optimum centrifugal juicing: the teeth shred the agricultural product A while the latter is pressed, and the substances thus obtained (juice, peel and pulp) are propelled by centrifugal action toward the peripheral region of the tank 11.

As shown, while the juice can flow through the metal sheet 13 (which indeed constitutes the lateral surface of the tank 11), the pulp and peel (which, due to their dimensions, are unable to pass through the holes 13a provided along the metal sheet 13) rise automatically along the lateral surface of the tank 11 until they cross the interspace 19 and fall into the collection vessel 20.

The waste is therefore separated effectively (and automatically) from the juice (the desired extract), the latter falling onto the bottom 14b of the pot 14, and then being conveyed, by means of the manifold 15, into the channel 16, which transfers it (by way of the first pump) to the dispensing nozzle 17. From the nozzle 17, the extract can be drawn directly by the user or can be poured into a cup (or the like), which in turn can be picked up by the user.

It is stressed, therefore, that the vending machine 1 according to the disclosure allows to perform all the actions required for optimum centrifugal juicing (pressing of the agricultural product A and simultaneous shredding), thereby allowing to obtain extracts of good quality.

The vending machine 1 allows to offer the consumer a beverage composed of the juice (extracted by centrifugal juicing and/or squeezing) of an agricultural product A of any type. Furthermore, by programming appropriately the control and management unit it is possible to give the vending machine 1 the possibly to accumulate the juice of two or more agricultural products A (which are mutually identical or different, each obtained selectively by centrifugal juicing or squeezing) in order to offer a larger quantity of beverage and/or a sort of cocktail, composed of a plurality of agricultural products A obtained in various manners.

Furthermore, the particular constructive choice for the magazine 3 (provided with one or more drawers 21 and with respective automated handling units) and for the chute 22 allows to obtain a vending machine 1 that is capable of storing and subsequently transferring precisely, and at the same time simply, the agricultural products A to the centrifugal juicing device 5.

In practice it has been found that the vending machine according to the disclosure achieves fully the intended aim, since the resort to a centrifugal juicing device that comprises an element for the automatic pressing of the agricultural product to be subjected to centrifugal juicing against a rotating reference surface, affected by automatic shredding means, allows to provide a vending machine that is capable of dispensing extracts of good quality.

The disclosure thus conceived is susceptible of numerous modifications and variations. For example, the arrangement within the casing 2 of a dispenser or dosage unit for additives (in powder, liquids or even gases), conveniently arranged along the path of the juice (or of the agricultural product A), so as to be able to add such additives to the extract to be provided to the consumer, is not excluded.

It is in fact specified that by way of the appropriately chosen arrangement (for example downstream of the nozzle 17 and of the juicing unit 32), such additive can be added to any beverage provided to the consumer by means of the vending machine 1 according to the disclosure, and therefore both to a juice obtained by squeezing and to a juice obtained by centrifugal extraction (which, as mentioned, can be derived from a single agricultural product A or from two or more agricultural products A), or to a mixture of the two preceding types.

All the details may further be replaced with other technically equivalent elements.

In the examples of embodiment shown, individual characteristics, given in relation to specific examples, may actually be interchanged with other different characteristics that exist in other examples of embodiment.

In practice, the materials used, as well as the dimensions, may be any according to requirements and to the state of the art.

The invention claimed is:

1. A beverage vending machine, comprising at least one outer casing, provided with at least one magazine for accommodating agricultural products of the type of fruit and vegetables, functionally associated with at least one centrifugal juicing device of the agricultural products, in order to obtain an extract that can be utilized outside said casing, wherein said at least one centrifugal juicing device comprises at least one element for the automatic pressing of at least one agricultural product to be subjected to centrifugal juicing against a rotating reference surface, affected by means for the automatic shredding of the at least one agricultural product, supplied by said magazine, for its optimum centrifugal juicing, wherein said element comprises a linear actuator that can be actuated automatically by a respective control and management unit, during the rotation of said reference surface, for transition from a first inactive extreme position, in which it is spaced from said reference surface, to a second active extreme position, in which a pestle supported by an end of said actuator faces and is proximate to said reference surface and is at least partially accommodated in a chamber for containing the agricultural product, and vice versa, during the transition from said first extreme position to said second extreme position the at least one agricultural product introduced in said chamber being pressed against at least one respective reference surface, wherein said centrifugal juicing device comprises a substantially frustum-shaped rotating tank accommodated coaxially in an external pot, said tank and said pot are closed partially by an upper lid, said pestle being movable along a direction that coincides with an axis of said tank and being accommodated coaxially, in said second extreme position, in a guiding sleeve that defines, together with said reference surface, said containment chamber, and wherein said magazine comprises at least one drawer that faces a chute that is inclined toward an opening that is provided in said lid and defines an inlet for said sleeve, said at least one drawer being provided with an automated movement assembly, actuated by said control and management unit, for transferring one by one the agricultural products toward said inclined chute and said centrifugal juicing device.

2. The vending machine according to claim 1, wherein said tank being open in an upper region, at a larger face thereof, and being closed in a lower region, at a smaller face thereof, by a floor, which constitutes said reference surface.

3. The vending machine according to claim 1, wherein said magazine is constituted substantially by a plurality of drawers that are arranged mutually side-by-side and are distributed on a plurality of respective planes, each one of said drawers facing said chute and being provided with a respective said assembly, comprising a wire that is wound helically around a track for the agricultural products, which is accommodated in the respective said drawer, each one of said wires rotating about the corresponding said track for the movement of at least one agricultural product arranged along said track between two consecutive turns of said wire wound helically.

4. The vending machine according to claim 1, wherein a lateral surface of said frustum-shaped tank is constituted by a metal sheet provided with a plurality of holes, for filtering substances obtained during a rotation of said floor as a consequence of the pressing and shredding actions, and for a substantial separation of a liquid part, which constitutes the extract, from a pulp and a peel, which define centrifugal juicing waste.

5. The vending machine according to claim 4, wherein a folded lip of said metal sheet, provided at said larger face of said tank, resting rotatably on the open upper rim of said pot, said pot having, on its bottom, a manifold associated with a channel, and leading to a nozzle for dispensing the extract, obtained by filtration through said metal sheet.

6. The vending machine according to claim 5, wherein between one portion of said lip and said lid there being an interspace that faces a vessel for collecting centrifugal juicing waste, which rises progressively along said metal sheet, during the rotation of said tank, up to said lip, and the fall by gravity into said vessel.

\* \* \* \* \*